(12) United States Patent
Jacobs et al.

(10) Patent No.: US 7,057,734 B2
(45) Date of Patent: Jun. 6, 2006

(54) INTEGRATED REACTION WHEEL ASSEMBLY AND FIBER OPTIC GYRO

(75) Inventors: Jack H. Jacobs, Glendale, AZ (US); Ed C. Moulton, Tarpon Springs, FL (US)

(73) Assignee: Honeywell International Inc., Morristown, NJ (US)

( * ) Notice: Subject to any disclaimer, the term of this patent is extended or adjusted under 35 U.S.C. 154(b) by 361 days.

(21) Appl. No.: 10/624,688

(22) Filed: Jul. 23, 2003

(65) Prior Publication Data

US 2005/0018198 A1    Jan. 27, 2005

(51) Int. Cl.
*G01C 19/72*  (2006.01)
*G01C 19/02*  (2006.01)
*B64G 1/28*   (2006.01)

(52) U.S. Cl. .................. 356/460; 244/165; 74/5.22
(58) Field of Classification Search ........... 356/460; 244/165, 170, 171; 74/5.22
See application file for complete search history.

(56) References Cited

U.S. PATENT DOCUMENTS 5,875,676 A     3/1999  Bailey et al.
6,377,352 B1 *  4/2002  Coronato et al. .......... 356/460

OTHER PUBLICATIONS

PCT International Search Report: PCT/US2004/023218, Apr. 27, 2005, International Search Authority—EP Patent Office, 6 pages.
Craig T. Herdman, "Fiber-Optic Gyroscopes", 1996 Scientific Honeyweller.

* cited by examiner

*Primary Examiner*—Gregory J. Toatley, Jr.
*Assistant Examiner*—Patrick Connolly
(74) *Attorney, Agent, or Firm*—Kurt A. Luther

(57) ABSTRACT

The present invention relates to a reaction wheel assembly and fiber optic gyro device. The device includes a reaction wheel assembly having a reaction wheel assembly housing, a fiber optic gyro coil integrated with the reaction wheel assembly housing, and a fiber optic gyro electronics integrated with the reaction wheel assembly housing. The fiber optic gyro coil may be wound around the reaction wheel assembly housing. The gyro coil may also be located within the reaction wheel assembly housing.

11 Claims, 3 Drawing Sheets

INTEGRATED REACTION WHEEL ASSEMBLY AND FIBER OPTIC GYRO

BACKGROUND

1. Field of the Invention

The present invention relates generally to an attitude reference system. More specifically, the present invention relates to an integrated reaction wheel assembly (RWA) and fiber optic gyro (FOG) that may be used in the aerospace industry.

2. Background of the Invention

As is well known, a FOG operates on a principal known as the Sagnac effect, which describes what happens when two beams of light travel in opposite directions around the same closed path. If the path is not rotating, the two beams complete their circuit and arrive back at the starting point at the same instant. When the structure is rotating about an appropriate axis, however, the two beams traverse different path lengths, i.e. the beam traveling in the direction of rotation travels a longer path and vice versa. This difference is small, but it can be detected and measured to indicate rotation rate.

When light moves through a material medium, it remains decoupled from the motions of that medium. Unlike water flowing through a pipe, light in an optical fiber is not dragged along when the fiber moves. Specifically the motion of the light waves is unaffected when a loop of fiber carrying counterpropogating beams begins to rotate around the axis passing through the plane of the loop. If two beams are launched simultaneously from an aperture initially at the twelve o'clock position of the loop, after one revolution, the beams come together again at that launch location.

If, however, the loop is rotating clockwise, the aperture will first encounter the counterclockwise beam somewhat earlier, for example at the one o'clock position, and will not catch up with the clock wise beam until later, for example the two o'clock position. Thus, to get back to the aperture, one beam has to follow a longer path than the other. The difference in path length is proportional to the loop's rate of rotation. Measuring this difference is the basis of a FOG.

A FOG has a long physical path length defined by many turns of optical fiber wound into a coil. The beam is divided and injected into opposite ends of the coil, makes a single pass through it, and comes out the other end. Then the two beams are recombined, forming an interference pattern. Since the beams trace exactly the same physical path, although in opposite directions, the interference should be fully constructive in the absence of a Sagnac effect. Rotation changes the path lengths and the phases of the interfering beams, thus producing changes in the fringe intensity that are proportional to the rotation rate.

Longer light paths in a FOG increase the instrument's sensitivity. For fiber wound into a round coil, the magnitude of the Sagnac effect is proportional to the rotational velocity and to the product of the coil diameter and the length of optical fiber on the coil. A typical FOG designed for aircraft navigation will use about 1,000 meters of optical fiber wound in a coil with a mean diameter of about six centimeters.

The aerospace market has a need for a low inertial noise attitude reference system that offers long life and increased inertial performance (lower noise) while minimizing mass. Current systems utilize a separate inertial reference unit (IRU) assembly, which can add additional mass to a satellite.

In addition to IRUs, satellite manufacturers separately install multiple reaction wheel assemblies (RWAs) on a spacecraft to impart rotational rates about the craft's three axes. Gyro packages or IRUs are employed to measure input rates about these three axes. The spacecraft guidance and control processor typically closes all attitude control loops, using information to and from both the IRU and RWA devices. Having both of these devices is expensive, results in increased mass, and reduces the already limited space available on, for example, satellites. These problems may be exacerbated when improved FOG performance is desired because increased length-diameter product results in increased mass or volume.

BRIEF SUMMARY OF THE INVENTION

According to one aspect, a reaction wheel assembly and fiber optic gyro device is disclosed. The device may include a reaction wheel assembly having a reaction wheel assembly housing, a fiber optic gyro coil integrated with the reaction wheel assembly housing, and a fiber optic gyro electronics integrated with the reaction wheel assembly housing.

According to another aspect, the fiber optic gyro coil may be wound around the reaction wheel assembly housing.

In another aspect, the gyro coil may also be located within the reaction wheel assembly housing.

DETAILED DESCRIPTION OF THE INVENTION

Figure 1:
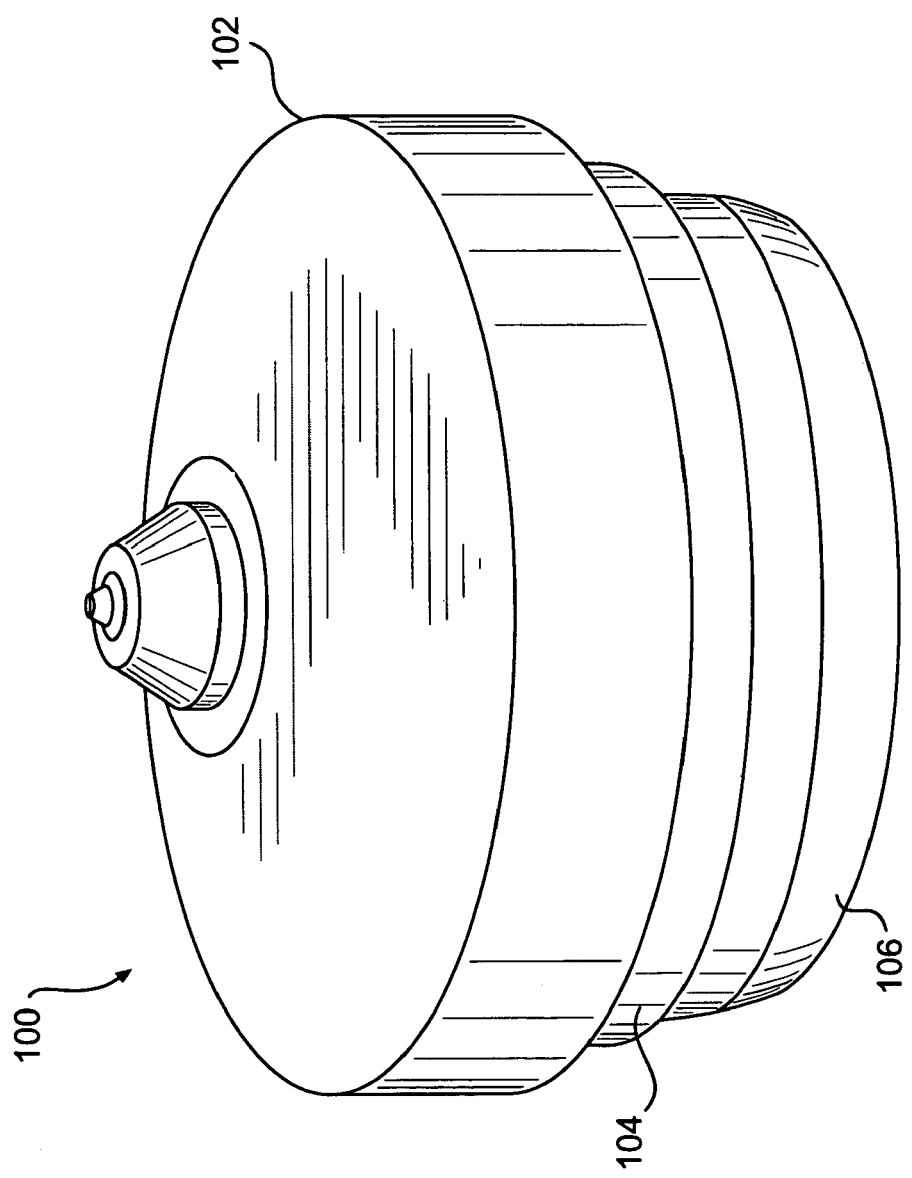
FIG. 1 is a perspective view of an integrated RWA/FOG device.

Three performance issues are of primary importance in optical gyroscopes. The first of these is bias stability, or the stability of the output when the sensor is exposed to a constant input rate. Bias stability is measured in degrees per hour. Two factors for achieving good bias stability in a FOG are maintaining the reciprocity of the optical path and controlling polarization errors. Maintaining reciprocity is a major goal of the entire optical design. Suppressing polarization errors calls for some additional steps.

There is an opportunity for cross coupling of the two polarization modes at every fiber splice. The number of beams is effectively doubled at each splice, until there are thousands of independent beams running through the sensor. Whenever one of the cross-coupled beams is coherent with the main signal beam, it adds some phase error to the gyroscope output. FOG designers have a number of tricks for suppressing these errors. Choosing a light source with a very short coherence length is an important part of the strategy. With such a source, two beams arriving at the detector are coherent only if they were emitted at nearly the same instant and hence only if path lengths are equal to within a few micrometers.

A second trick is to install segments of birefringent fiber ahead of critical cross-coupling sites. The two polarization waves propagate at different speeds in the birefringent material resulting in the beams being temporally separated and hence decorrelated to each other upon exiting the fiber. Another step is to hold very tight tolerances on the angular alignment of splice joints to minimize the magnitude of the cross-coupled signal. Finally, polarizers with a very high extinction ratio block as much light as possible in the off-axis polarization mode. Combining all these measures is advantageous in achieving the 0.01 degree per hour bias stability needed in a navigation-grade gyro.

Random noise is the second major performance parameter. It is white noise with equal content of all frequencies superimposed on the output signal. The customary unit of measure for the noise is degree/root hour. Since the noise is white, it tends to cancel itself out when it is averaged or integrated over a long period. Thus, in principle, it can be reduced to an arbitrarily low level given enough time. The existence of this noise means there is some uncertainty in any measurement of the rotation rate. The uncertainty is smaller when the signal is averaged over a longer period of time.

The major sources of random noise in a FOG are backscattered light from fiber imperfections, photon shot noise in the detector, electronic thermal noise, and intensity fluctuations in the light source. A backscattered beam is one that goes partway around the loop, say, in the clockwise direction and then after reflection suddenly appears to be part of the counterclockwise beam. Spurious interference from many such reflected beams would overwhelm the genuine gyroscopic signal. But, with a short coherence length light source, backscattered beams will reach each the detector in correlation with the primary beam only if they happen to be scattered within a few micrometers of the center of the coil. Before short coherence length sources were tried, noise contamination in FOGs was so severe that they could not reliably detect the Earth's rotation.

Photon shot noise is caused by the random statistical nature of photons impinging on the detector and releasing electrical charge carriers. Its magnitude decreases in proportion to the square root of the optical power reaching the detector. Photon shot noise sets a fundamental lower limit on the noise budget of the sensor and in many FOG products is the dominant noise source. In some high-performance gyros, a high-power light source reduces photon shot noise to a very low level. When this is done, fluctuations in light source intensity can become the dominant noise source. Because this form of noise is a characteristic of the light source fluctuations, it can be measured and canceled or subtracted out.

Another of the three aforementioned performance parameters is scale-factor accuracy. Ideally, a gyro would exhibit a perfectly linear relationship between input rotation rate and output pulse rate. Scale-factor accuracy describes departures from this ideal. Errors are characterized by deviations from the perfect linear graph, expressed in units of parts per million. Major sources of scale-factor error are temperature-dependent variations in the wavelength of the light source and uncertainties and nonlinearities associated with the signal processing electronics.

The wavelength of a semiconductor light source typically changes by about 300 parts per million per degree Celsius of temperature change. Any wavelength change has a one to one effect on the scale factor. Gyro designers must either characterize and compensate for these errors or else control the temperature of the light source. Until fairly recently, the above solutions limited FOG scale-factor performance to no better than 30 parts per million over a full range temperature environment. The adoption of doped-fiber light sources has significantly improved FOG scale-factor accuracy. These devices are 50 times less sensitive to temperature changes. Combining them with localized temperature control and compensation can yield one part per million performance.

Scale-factor errors and nonlinearities attributed to electronic components are a serious limitation o the performance of open-loop sensors. Over the full temperature range, it is hard to keep gain fluctuations below 1,000 parts per million, confining these sensors to non-navigation applications. In closed-loop sensors, the specific loop-closure design determines how linear the scale-factor relationship is. State of the art designs now attain an uncompensated linearity of roughly one part per million.

Taking into account all of these performance factors, it would be desirable to devise a FOG/RWA combination that performs to the levels necessary for use in navigation, but does so in a smaller package and without significantly adding weight to the satellite. Such a new multifunction device may be realized in accordance with the present invention by integrating a "long-life" FOG with a RWA. The resulting product offers both reaction torque and attitude information without the need for a separate IRU assembly, thus reducing weight to the satellite. The FOG may achieve lower inertial noise by increasing the fiber LD product without significant impact to the RWA footprint or envelope and also eliminates the traditional IRU package from the craft. Traditionally, improved FOG performance or increased LD product resulted in increased mass. The present invention leverages the RWA envelope and packaging to minimize impact to the spacecraft mass.

As mentioned above, satellite manufacturers presently install RWAs, up to four or more, on the spacecraft to impart rotational rates about the satellite's three axes. The spacecraft guidance and control processor typically closes all attitude control loops using information to and from both the IRU and the RWA devices. The integrated RWA/FOG of the present invention offers a prealigned sensor/effector solution that simplifies integration. The output data, however, may be used in much the same way as the traditional solution.

FIG. 1 depicts an integrated RWA/FOG device 100 according to one embodiment of the present invention. RWA/FOG 100 includes a housing 102 similar to that used with a traditional RWA. Housing 102 is modified in the present invention to include a FOG coil 104 along with the associated FOG electronics 106. By including the FOG componentry as an integrated portion of the RWA, less space may be consumed in the spacecraft.

Figure 2:
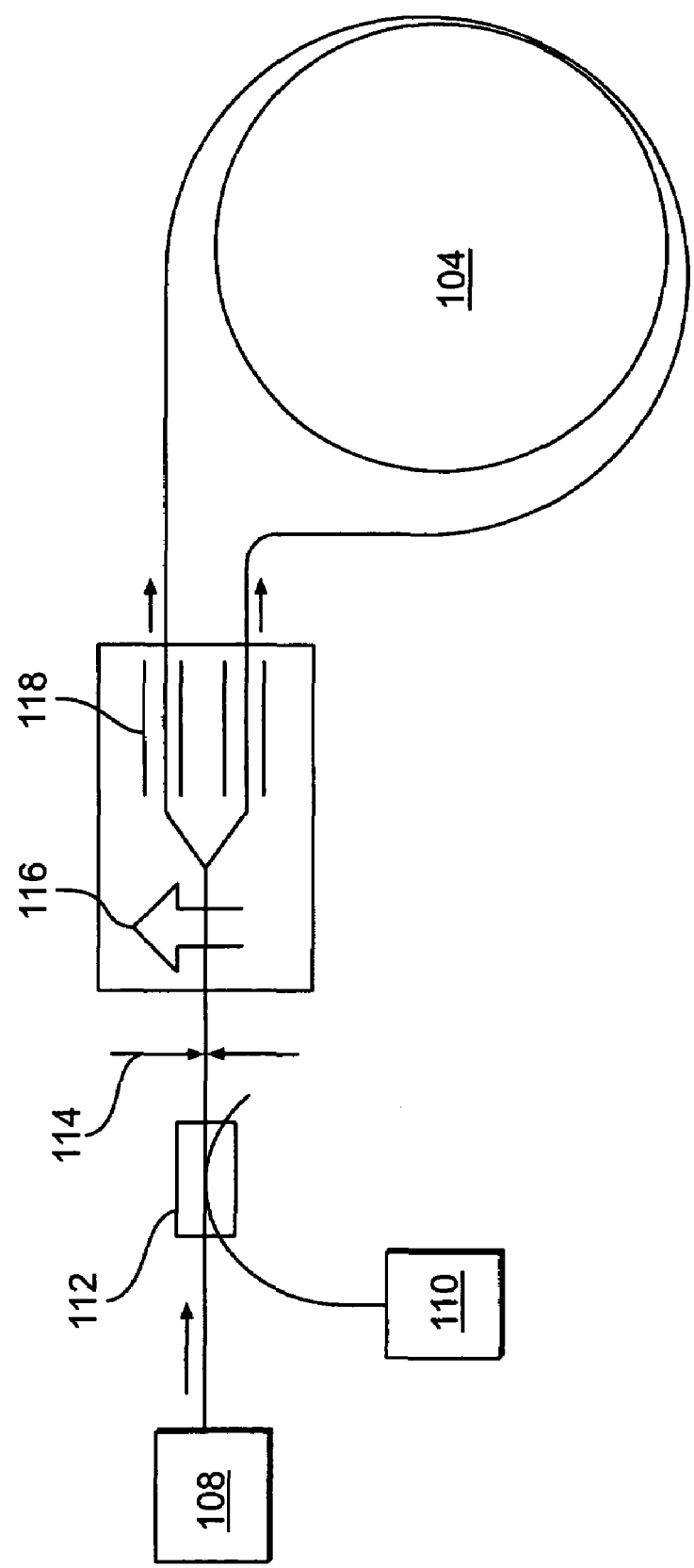
FIG. 2 is a schematic diagram of the components of a FOG.

FOG coil 104 comprises a coil of fiber optic cable wound around a portion of the RWA housing. As with traditional FOGs, coil 104 is connected to a light source 108 as shown schematically in FIG. 2. Light source 108 produces light at wavelengths in the near-infrared region, for example between about 0.83 micrometers and about 1.55 micrometers. One important specification for the light source is its coherence function, which describes the ability of two beams of light derived from the same source to create an interference pattern when the are recombined. Users of laser light sources may want to maximize the coherence function so that waves remain correlated over long distances or long intervals. In a FOG, the ideal is just the opposite. A short coherence helps to eliminate spurious interference from waves that have traveled non reciprocal paths. Light source 108 may be specially designed and fabricated to limit the coherence length to tens of micrometers, or less than fifty times the wavelength of the light emitted.

A detector 110 is included to convert an optical interference signal from the gyro to the electrical domain, where it can be processed and interpreted. Variations in brightness as the interference fringe passes across detector 110 become variations in voltage or current. Silicon photodetectors work well at shorter wavelengths, while more exotic quaternary compounds such as indium gallium arsenide phosphide (InGAsP) respond to the less energetic photons at longer wavelengths. Important specifications include the device's quantum efficiency (which designates the percentage of photons absorbed that create charge carriers in the semiconductor) and the frequency characteristics of the detector and its associated circuitry.

Coil 104 is wound from the center of the fiber, keeping pairs of points that are equidistant from the center adjacent to one another. The idea is to create a thermal symmetry between the coil halves to cancel environmentally introduced nonreciprocal errors. The fiber of coil 104 may be made of fused silica of about 80 or 125 micrometers in diameter, for example. The fiber may also have a protective organic coating on the surface. Light is not conducted throughout the bulk of the fiber, but only through an optical core or waveguide between approximately five and ten micrometers in diameter. The fiber may be a single-mode fiber, meaning that light in the waveguide is confined to a single spatially guided mode having two possible polarization states.

Some gyros may require polarization-maintaining fiber, in which one axis of the fiber is stressed during manufacture to create a material where the two polarization modes propagate at different velocities. This special fiber helps to suppress unwanted mixing between polarization states. Other gyros may be built with inexpensive single-mode fiber similar to that used in telecommunications lines.

The FOG electronics 106 include a fiber optic coupler 112 that is functionally equivalent to the half-silvered mirror that serves as a beam splitter in an optical system built from discrete components. Light entering coupler 112 is split into two beams traveling in the same direction, but exiting through separate ports. Coupler 112 may be made by closely bonding two lengths of fiber so that light leaks from one core into the other. Optical loss and the ability to maintain the entering polarization distribution in the exit legs may be important characteristics of coupler 112.

Light emitted from light source 108 also passes through other components of the FOG electronics 106 including a spatial filter 114, a polarizer 1 16,. and a phase modulator 118, which usually has a bandwidth or frequency response greater than 500 megahertz. These devices may be fabricated in a crystal of lithium niobate, for example, a material having a strong electro-optic coefficient. Waveguides may be created on the surface of this chip to distribute optical signals and electrodes may be deposited where electrical excitation would induce phase modulation. As seen in FIG. 1, FOG electronics 106 are included in a base portion of the RWA/FOG device 100.

Due to the integration of the FOG into the RWA housing 102, error may be introduced into the FOG because of vibration and motion of the reaction wheel. As mentioned above, performance of a FOG is related to its LD product. Typical FOGs have a diameter of about six centimeters, or roughly two to three inches. A typical RWA housing may be twelve inches or more, resulting in a much greater LD product. With the same 1,000 meters of fiber cable used in a six centimeter device wound around a twelve inch RWA housing, much greater performance may be achieved in the FOG. This greater LD product may by itself compensate for the additional error created by the movements inherent to the operation of the RWA. In addition to utilizing this greater LD product, the FOG/RWA assembly may be calibrated based on wheel speed feedback in order to filter the gyro output to account for the RWA induced motion. As the RWA ages or bearings begin to degrade, the FOG may actually serve as a sensor to diagnose health of the RWA before wheel current changes become obvious, which is currently an indicator of RWA health. This would allow more advance notice to ground operations for reconfiguring a spacecraft. The FOG may also be able to detect if any balance shift occurs over the life of the RWA. This could be sensed by the momentum vector shift and may be detected by the FOG at low frequencies. In addition to the increased LD product, utilizing RWA housing 102 as a winding core for coil 104 may simplify the FOG production.

Another advantage achieved by having an integrated RWA/FOG device is the ability to sense vibrations in all axes coming out of the RWA array. This allows for actively detuning the RWAs to run at speeds that do not beat with each other, thus minimizing detrimental effects on a spacecraft. Because the FOG is co-located with the RWA, such vibration sensing may be achieved.

Figure 3:
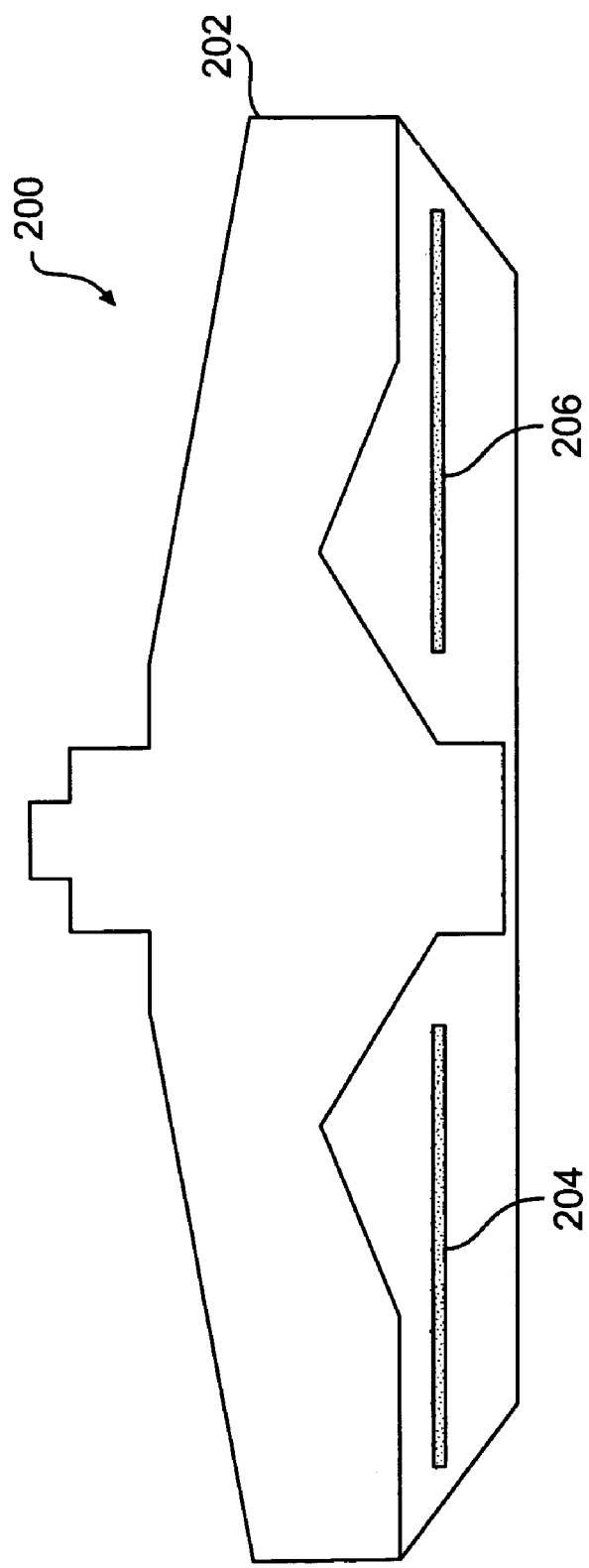
FIG. 3 is a cross-sectional view of an alternative embodiment of an integrated RWA/FOG device.

FIG. 3 shows an alternative embodiment of an integrated FOG/RWA device 200. In this embodiment, a smaller gyro 204, for example one having a diameter of approximately four inches, is included in the base of RWA housing 202. The gyro electronics 206 are included on the opposite side of housing 202. This embodiment may be advantageous in that RWA housing 202 may not need to be modified to accommodate a FOG device.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A reaction wheel assembly and fiber optic gyro device, comprising:
   a reaction wheel assembly having a reaction wheel assembly housing;
   a fiber optic gyro coil integrated with the reaction wheel assembly housing and having substantially the same diameter as a diameter of the reaction wheel assembly housing; and
   a fiber optic gyro electronics integrated with the reaction wheel assembly housing.

2. The device of claim 1, wherein the fiber optic coil is wound around the reaction wheel assembly housing.

3. The device of claim 1, wherein the fiber optic gyro electronics are located in a base portion of the reaction wheel assembly housing.

4. The device of claim 1, wherein the device is calibrated based on wheel speed feedback of the reaction wheel assembly to filter gyro output to account for motion introduced by the reaction wheel assembly.

5. The device of claim 1, wherein the fiber optic gyro electronics comprise:
   a light source
   a fiber optic coupler;
   a spatial filter;
   a detector;
   a polarizer; and
   a phase modulator.

6. An attitude reference system, comprising a plurality of reaction wheel assembly and fiber optic gyro devices as claimed in claim 1.

7. The attitude reference system of claim 5, comprising four reaction wheel assembly and fiber optic gyro devices as claimed in claim 1.

8. The device of claim 1, wherein the fiber optic coil comprises fused silica having a diameter of about 80 or 125 micrometers.

9. The device of claim 5, wherein the light source emits light in the near-infrared region.

10. The device of claim 9, wherein the light-source emits light having a wavelength of between about 0.83 micrometers and about 1.55 micrometers.

11. The device of claim 1, wherein the fiber optic gyro coil is located within the reaction wheel assembly housing.

* * * * *